United States Patent
Seymour et al.

(10) Patent No.: US 8,798,855 B2
(45) Date of Patent: Aug. 5, 2014

(54) SYSTEM AND METHOD FOR SELF-DETECTING VEHICLE THEFT

(71) Applicants: Shafer Seymour, Bartlett, IL (US); Peter Saladin, Palatine, IL (US)

(72) Inventors: Shafer Seymour, Bartlett, IL (US); Peter Saladin, Palatine, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 0 days.

(21) Appl. No.: 13/767,977

(22) Filed: Feb. 15, 2013

(65) Prior Publication Data
US 2013/0158746 A1 Jun. 20, 2013

Related U.S. Application Data

(62) Division of application No. 13/094,099, filed on Apr. 26, 2011, now Pat. No. 8,474,569.

(51) Int. Cl.
*B60R 25/00* (2013.01)

(52) U.S. Cl.
USPC .... 701/33.6; 340/426.1; 340/428; 340/568.1; 340/568.2

(58) Field of Classification Search
USPC ......... 340/426.1, 426.11, 426.12, 428, 568.1, 340/568.2; 701/33.6
See application file for complete search history.

(56) References Cited

U.S. PATENT DOCUMENTS

| | | | | |
|---|---|---|---|---|
| 5,334,969 A | * | 8/1994 | Abe et al. | 340/426.26 |
| 5,349,329 A | * | 9/1994 | Smith | 340/539.21 |
| 5,699,430 A | * | 12/1997 | Krizay et al. | 340/5.26 |
| 5,939,975 A | * | 8/1999 | Tsuria et al. | 340/426.18 |
| 6,426,693 B1 | * | 7/2002 | Inomata | 340/539.21 |
| 6,504,491 B1 | * | 1/2003 | Christians | 340/988 |
| 6,731,195 B2 | * | 5/2004 | Nemoto | 340/5.2 |
| 6,999,858 B2 | * | 2/2006 | Walker et al. | 701/1 |
| 7,245,252 B2 | * | 7/2007 | Knepper et al. | 342/125 |
| 7,388,465 B2 | * | 6/2008 | Simon | 340/5.31 |
| 7,532,608 B2 | * | 5/2009 | Hermann | 370/343 |
| 7,701,335 B2 | * | 4/2010 | Van Dongen et al. | 340/539.19 |
| 2004/0008103 A1 | * | 1/2004 | Kady et al. | 340/5.52 |
| 2005/0151629 A1 | * | 7/2005 | Simoneau | 340/426.11 |
| 2005/0242918 A1 | * | 11/2005 | Van Dongen et al. | 340/3.1 |
| 2006/0273885 A1 | * | 12/2006 | Thompson | 340/426.34 |

* cited by examiner

*Primary Examiner* — Thomas Black
*Assistant Examiner* — Peter D Nolan

(57) ABSTRACT

A system and method for self-detecting vehicle theft is provided that includes a first antenna and a second antenna, both located on a vehicle. The first antenna transmits the signal and the second antenna receives the signal. A monitoring module in communication with the second antenna is configured to determine whether the signal has changed. A vehicle security system is configured to activate based on a change in the signal.

7 Claims, 4 Drawing Sheets

SYSTEM AND METHOD FOR SELF-DETECTING VEHICLE THEFT

FIELD

The present disclosure generally relates to vehicle security systems, and more particularly to automatically detecting vehicle theft.

BACKGROUND

Vehicles implement various security measures to combat vehicle theft. For example, upon theft, an antenna within the vehicle can transmit a signal to and thus notify a service provider, who may then remotely disable the vehicle.

However, a thief may thwart such a security measure by covering the antenna with a radio frequency (RF) absorbing device, for example a Faraday blanket, which prevents the service provider from receiving the signal. The vehicle can thus no longer be tracked, and the thief may successfully steal the vehicle.

SUMMARY

In overcoming the drawbacks and other limitations of the related art, the present disclosure provides a system and method for self-detecting vehicle theft by monitoring signal transmissions in the vehicle.

In some implementations, the present disclosure relates to a method for self-detecting vehicle theft in a vehicle, comprising the following steps. A signal is transmitted from a first location on the vehicle. The signal is received at a second location on the vehicle. Whether the signal was changed is determined. A vehicle security system may be activated based on the change in the signal.

In some implementations, the present disclosure relates to an apparatus for self-detecting theft in a vehicle. A first antenna is configured to transmit a signal and attached to a network access device that is located on the vehicle. A second antenna is configured to receive the signal and located on the vehicle. A monitoring module is in communication with the second antenna and configured to determine whether the signal has changed. A vehicle security system is configured to activate based on a change in the signal.

In some implementations, the present disclosure relates to a computer readable storage medium having stored therein instructions executable by a programmed processor for determining if a vehicle is stolen, the storage medium comprising instructions for the following steps. Determinations are made as to whether a received signal was changed at the transmission source and whether the received signal was changed after transmission. A vehicle security device is activated if the received signal was changed.

In some implementations, the present disclosure relates to an apparatus for self-detecting theft in a vehicle. A first antenna is configured to transmit a signal and attached to a network access device that is located on the vehicle. A second antenna is configured to receive the signal and located on the vehicle. A receiver is in communication with the second antenna and configured to analyze the signal, the analysis of the signal comprising determining whether the signal is interrupted, determining whether the signal magnitude varies from a predetermined baseline magnitude, detecting patterns in the signal, and analyzing data in the signal. A processor is configured to detect a functional status of a transmitter. A vehicle security device is configured to disable the vehicle based upon the analysis of the signal and if the functional status of a transmitter is operative.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various implementations thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
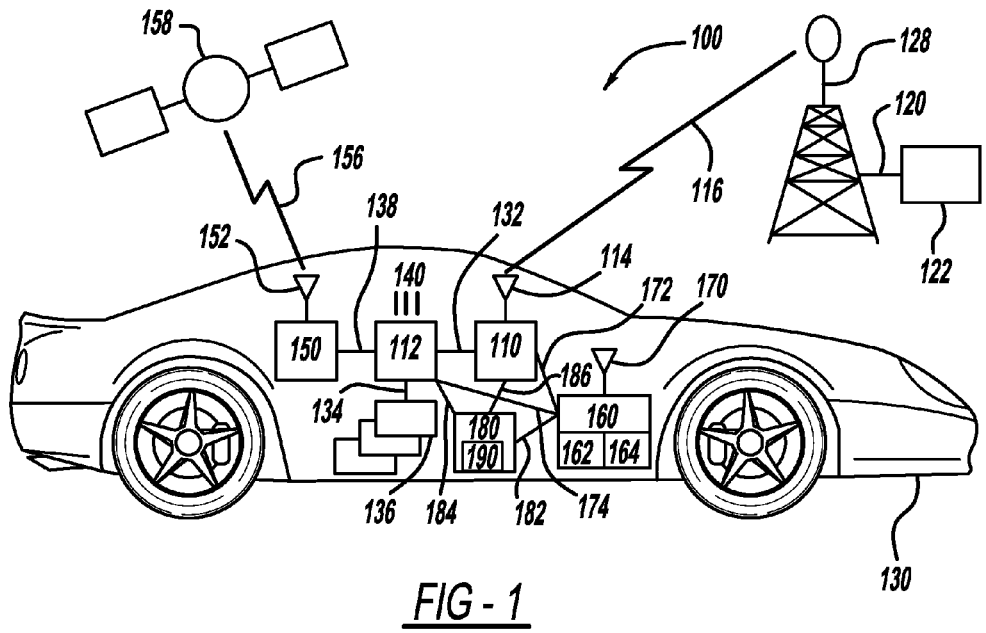
FIG. 1 is a schematic view of a system for self-detecting vehicle theft with a telematics controller and network access device implemented within a motor vehicle.

Now referring to FIG. 1, an implementation of a system 100 for self-detecting vehicle theft is provided within a vehicle 130. The network access device 110 may be provided in the same or a separate package from the telematics controller 112. The network access device 110 may be located on the vehicle 130, for example in the dashboard. As defined herein, "located on" means located anywhere on the interior or exterior of the vehicle 130, or anywhere on within, inside, outside, attached to, or integral with of any particular part of the vehicle 130 such as the dashboard, roof, trunk, hood, or any other part of the vehicle 130. The network access device 110 may be connected to an antenna 114. The antenna 114 may be representative of a plurality of antennas or a matrix of antennas depending upon the particular communication mode selected, and may have transmit/receive functionality. The antenna 114 may be located on a vehicle's dashboard, roof, trunk, hood, or any other part of the vehicle 130. Communication of the network access device 110 is facilitated with a remote station 128, as denoted by a signal 116. As described previously, the remote station 128 may be in communication with a service provider 122 including a network server through a network 120.

The telematics controller 112 may be in communication with a global positioning device 150 over the vehicle bus 140 or a custom connection as denoted by line 138. The global positioning device 150, such as a satellite global positioning system (GPS), may be in communication with an antenna 152. The antenna 152 may be one of a plurality of antennas or a matrix of antennas. Further, the antenna or plurality of antennas represented by reference number 152 may be the same antennas, as denoted by reference number 114. The GPS unit may be in communication with a satellite 158, as denoted by line 156. As such, the GPS unit 150 may retrieve positional data for the vehicle or in other implementations 150 may also represent a general satellite receiver and, therefore, may receive other general broadcast information or communication from the satellite 158.

The telematics controller 112 may also be in communication with various other vehicle devices and systems through the vehicle bus, wire harnesses, or other wireless connections, as denoted by line 134. The various other devices 136 may include but are not limited to the engine control system, the vehicle locks, the vehicle safety systems (e.g. seatbelt retractors, airbags, etc.), vehicle entertainment system, or a suspension control system.

The system 100 may also provide a monitoring module 160. The monitoring module 160 may include a transmitter, receiver, processor, and memory (not pictured). The monitoring module 160 may be connected to an antenna 170. The antenna 170 may be representative of a plurality of antennas or a matrix of antennas depending upon the particular communication mode selected. The monitoring module 160 and/or the antenna 170 may be located on the vehicle 130. In some implementations, the monitoring module 160 and/or the antenna 170 are located remotely from the antenna 114. In some implementation, the antenna 114 may be in the dash and the antenna 170 may be on the hood, for example at a distance of 5 feet. As a result, a thief who attempts to place a Faraday blanket over the antenna 114 would not be able to able to cover both antennas 114 and 170 simultaneously. Particularly, the antennas 114 and 170 may be placed in locations such that a Faraday blanket placed over the antenna 114 would disrupt the transmission of the signal between the antennas 114 and 170. In various implementations, the monitoring module 160 may communicate with the network access device 110. In some implementations, the monitoring module 160 may be in communication with the telematics controller 112 over the vehicle bus 140, and the telematics controller 112 may then communicate to the network access device 110. The monitoring module 160 may also be in communication with the network access device 110 through a custom connection 172. Further, the monitoring module 160 may also be in communication with the telematics controller 112 through custom connection 174, and the telematics controller 112 may then communicate to the network access device 110, as denoted by line 132.

The system 100 may also provide a stolen vehicle tracking (SVT) module 180. In various implementations, the SVT module 180 may communicate with the monitoring module 160. For example, the SVT module 180 may be in communication with the monitoring module 160 over the vehicle bus 140 or over a custom connection, as denoted by line 182. The SVT module 180 may, further, be in communication with the telematics controller 112 over the vehicle bus 140 or over a custom connection, as denoted by line 184. The SVT module may also be in communication with the network access device 110 over custom connection 186.

The antenna 114 connected to the network access device 110 may transmit the signal 116, with the intended recipient being, for example, a remote station 128. In various implementations, the network access device 110 may insert one or more patterns or one or more data markers into the signal 116, for purposes of signal authentication. The pattern in the signal can be a cyclic pattern of transmitting the signal and not transmitting the signal. This pattern can be implemented by turning the network access device 110 on and off, or by turning the antenna 114 on and off. In another example, the signal magnitude may be varied according to a specific pattern, for example, cycling the signal between one or more magnitudes, including full, 90%, 80%, 70%, 60%, 50%, and all other magnitudes. The patterns may also be sinusoidal, or be any other patterns well known to those skilled in the art. The data marker may, for example, be metadata or a watermark. The signal may also contain data content. The term "data" is defined herein to include both data markers and data content in the signal 116.

The antenna 170 connected to the monitoring module 160 may receive the signal 116 transmitted by the antenna 114 connected to the network access device 110. Components of the monitoring module 160, for example the receiver 162 and processor 164, may be configured to continuously monitor and analyze the signal 116 received by the antenna 170.

The monitoring module 160 may detect, monitor, and analyze properties of the signal 116, for example its magnitude, patterns, and data, particularly by determining whether any measured properties of the signal 116 have changed relative to expected properties of the signal 116. The receiver 162 or the processor 164 of the monitoring module 160 may compare the measured properties of the signal 116 with the expected properties of the signal 116. The expected properties of the signal 116 may be based on predetermined expected properties stored in, for example, the memory of the monitoring module 160. The expected properties of the signal 116 may also be based on dynamic updates from the network access device 110 over the custom connection 172, or from the telematics controller 112 over the custom connection 174 or the vehicle bus 140. The monitoring module 160 may also employ artificial intelligence techniques, for example symbolic rules or neural networks, to dynamically vary the expected properties of the signal 116 in accordance with changing external and environmental conditions.

The change of the measured properties of the signal 116 relative to the expected properties of the signal 116 may take many forms. The change may constitute a disruption or interruption in signal reception caused, for example, by a Faraday blanket. In another example, the change may constitute a measured magnitude of the signal 116 being lower than a predetermined expected baseline magnitude. In a further example, the change may constitute the measured magnitude of the signal 116 being higher than a predetermined expected baseline magnitude, caused for example by a decoy transmitter employed by a thief. In another example, the change may constitute one or more expected patterns in the signal 116, which are inserted by the network access device 110, not matching one or more measured patterns in the signal 116. In a further example, the change may constitute one or more expected data markers in the signal 116, inserted by the network access device 110, not matching one or more measured data markers in the signal 116. In another example, the change may constitute expected data content in the signal 116 not matching measured data content in the signal 116. Moreover, any of the foregoing examples may be implemented together and/or with other parameters indicative of theft, for example with an RF key fob.

If the monitoring module 160 and its associated components determine that one or more of the changes in the signal properties has occurred, the monitoring module 160 may report the changes to the SVT module 180, or in some implementations, the SVT module 180 may query the monitoring module 160 regarding whether one or more of the changes in the signal properties has occurred. In some implementations, any change must exceed a certain change threshold for a report to be sent to the SVT module 180. For example, the magnitude of the signal may have to vary more than 50% from the predetermined expected baseline magnitude for a report to be sent to the SVT module 180.

Once the SVT module 180 receives a report from the monitoring module 160, the SVT module 180 may then communicate with the network access device 110 over the custom connection 186, or with the telematics controller 112 over the custom connection 184 or the vehicle bus 140. The telematics controller 112 or the network access device 110 may send a report to or receive a query from the SVT module 180 regarding the functional status of the antenna 114 and/or network access device 110. The functional status of the antenna 114 and/or the network access device 110 may each be operative or inoperative. Determining the functional status of the antenna 114 and/or the network access device 110 may comprise verifying whether the signal 116 is being transmitted from the transmission source, for example the antenna 114.

If the SVT module 180 determines that the functional status of the antenna 114 and/or the network access device 110 is inoperative, or if it detects that the signal 116 is no longer being transmitted from the antenna 114, the SVT module 180 may then activate a vehicle security system 190. In some implementations, the vehicle security system 190 may be a component of the SVT module 180. In other implementations, the vehicle security system 190 may be a separate component in communication with the SVT module 180 over the vehicle bus 140 or a custom connection (not pictured). In some implementations, the SVT module 180 may activate the vehicle security system 190 without a determination of the functional status of the antenna 114 and/or the network access device 110, and base the activation of the vehicle security system 190 solely on the changes in signal properties as determined by the monitoring module 160.

The activation of the vehicle security system 190 may constitute disabling the vehicle 130. For example, the vehicle security system 190 may automatically shut down the vehicle 130, for example by disabling the powertrain or applying the brakes. The vehicle security system 190 may also prevent the vehicle 130 from exceeding a predetermined speed (for example, 5, 10, 15 or 20 miles per hour), flashing a vehicle light, or honking a vehicle horn. The vehicle security system 190 may also utilize the global positioning device 150 and the antenna 152 to determine a location where the vehicle 130 is to be disabled, automatically shut down, have its brakes applied, speed limited, lights flashed, or horn honked. The vehicle security system 190 may determine the most advantageous location based on a current and anticipated route. For example, a busy street in town would be preferred to a deserted country road, as there is a higher likelihood of discovery by the police. The vehicle security system 190 may also utilize the antenna 170 connected to the monitoring module 160, or a backup antenna (not pictured) in communication with vehicle security system 190 to report the theft to a service provider.

Figure 2:
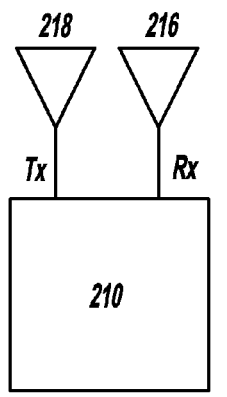
FIG. 2 is a schematic view of a network access device connected a transmit and receive antenna pair.
Figure 3:
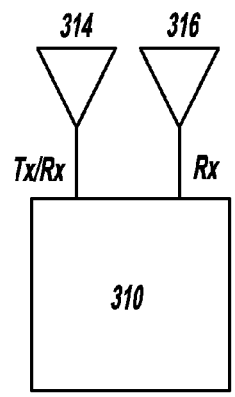
FIG. 3 is a schematic view of a network access device connected to a transmit/receive antenna and a receive antenna.

Now referring to FIG. 2 and FIG. 3, implementations of the network access device and connected antennas are provided. Now referring to FIG. 2, a network access device 210 connected to a receive antenna 216 and a transmit antenna 218 pair is provided. The receive antenna 216 and the transmit antenna 218 may be located remotely from one another on the vehicle 130. For example, the receive antenna 216 may be located on one of the vehicle's dashboard, roof, trunk, hood, or any other part of the vehicle 130, and the transmit antenna 218 may be located on another of the vehicle's dashboard, roof, trunk, hood, or any other part of the vehicle 130. The network access device 210, the receive antenna 216, and the transmit antenna 218 may be used in place of the network access device 110, the antenna 170, and the antenna 114, respectively. In this implementation, the monitoring module 160 may be in communication with or connected to the receive antenna 216. In some implementations, the monitoring module 160 may be a component of the network access device 210. In some implementations, the monitoring module 160 may be an integral part of the network access device 210 and the network device 210 may perform all the functions of the monitoring module 160.

Now referring to FIG. 3, a network access device 310 is provided that has a first input and a second input, the first input being connected to a transmit/receive antenna 314 and the second input being connected to a receive antenna 316. The transmit/receive antenna 314 and the receive antenna 316 may be located remotely from one another in the vehicle 130. For example, the transmit/receive antenna 314 may be located on one of the vehicle's dashboard, roof, trunk, hood, or any other part of the vehicle 130, and the receive antenna 316 may be located on another of the vehicle's dashboard, roof, trunk, hood, or any other part of the vehicle 130. The network access device 310, the transmit/receive antenna 314, and the receive antenna 316 may be used in place of the network device 110, the antenna 114, and the antenna 170, respectively. In this implementation, the monitoring module 160 may be in communication with or connected to the receive antenna 316. In some implementations, the monitoring module 160 may be a component of the network access device 310. In some implementations, the monitoring module 160 may be an integral part of the network access device 310 and the network device 310 may perform all the functions of the monitoring module 160.

Figure 4:
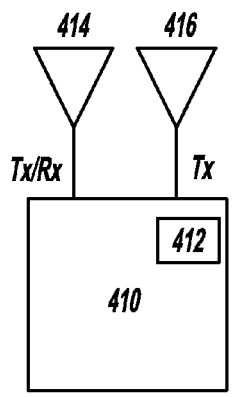
FIG. 4 is a schematic view of a third antenna connected to a transmitter.

Referring now to FIG. 4, the system 100 may provide a third antenna 416 connected to a transmitter 412, wherein the third antenna 416 is co-located with a transmit/receive antenna 414 (a first antenna) and located remotely from the antenna 170 (a second antenna). The transmitter 412 may be a component of a network access device 410. The third antenna 416 may be connected to the network access device 410. In some implementations, the transmitter 412 may be in communication with the network access device 410 over a custom connection. In some implementations, the transmitter 412 may be in communication with the telematics controller 112 over the vehicle bus 140, and the telematics controller 112 may then communicate with the network access device 410. The transmit/receive antenna 414 and the network access device 410 may be used in place of the antenna 114 and the network access device 110. The third antenna 416 may operate at a different frequency, lower power, and/or use a different protocol than the antenna 414. The third antenna 416 and the transmit/receive antenna 414 may operate together, such that if one is transmitting, the other will also be transmitting. The third antenna 416 may then transmit a signal intended for the antenna 170 of the monitoring module 160. Because the signal transmitted by the third antenna 416 may only be intended to be received by the antenna 170, the transmitted data need not comply with network standards, and on/off pattern modulation may be easier to implement. In some implementations, the components of FIG. 4 may be implemented together with the components of FIG. 2 and/or FIG. 3.

Figure 5:
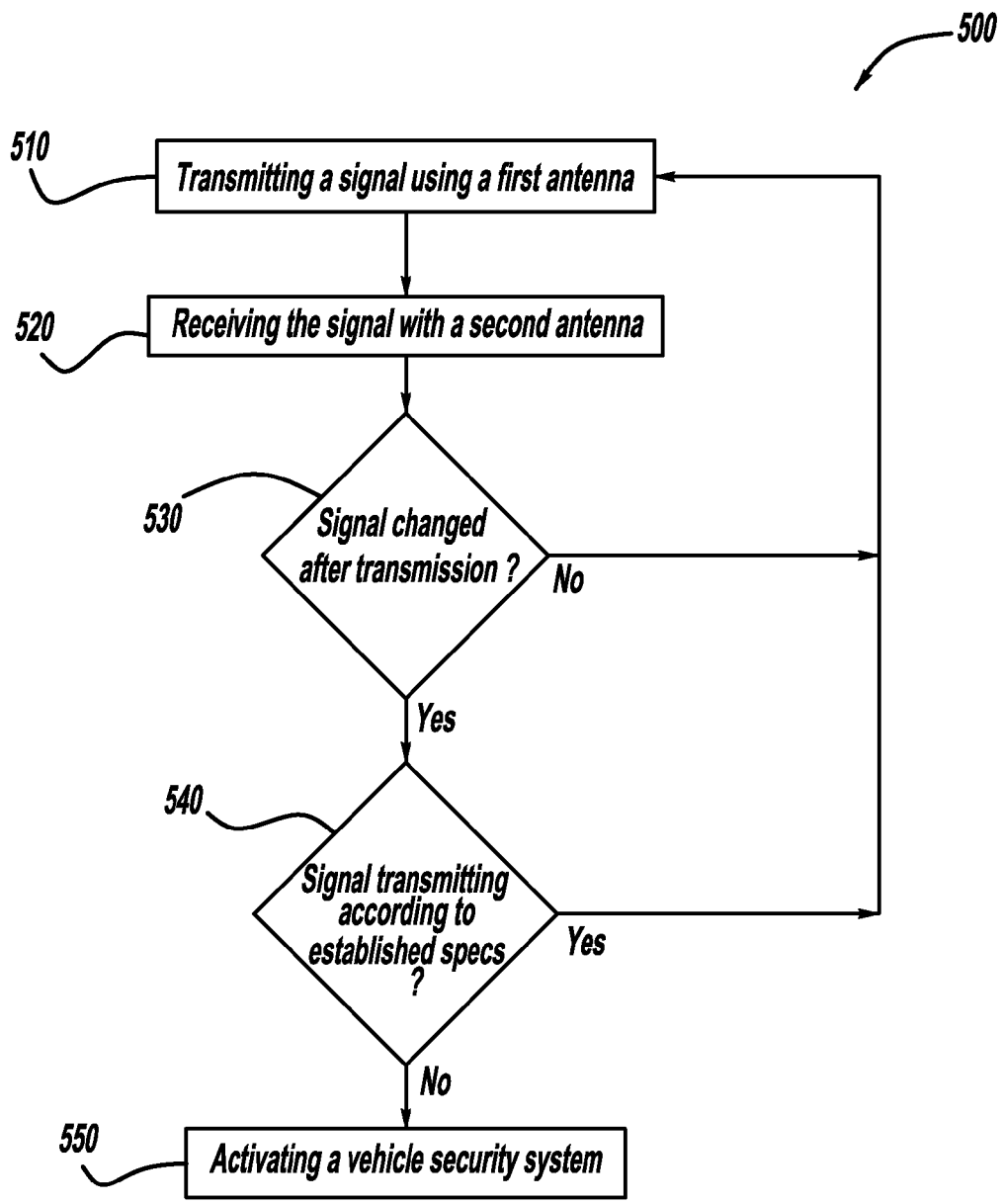
FIG. 5 is a flow chart illustrating a method for self-detecting vehicle theft in a vehicle.

Now referring to FIG. 5, a method 500 for self-detecting vehicle theft in a vehicle is provided. The ordering of the steps presented herein is merely one implementation of the method 500. Those skilled in the art will recognize that the ordering may be varied, that some steps may occur simultaneously, that some steps may be omitted, and that further steps may be added. In block 510, a first antenna attached to a network access device that is located at a first location on the vehicle transmits a signal, if the network access device and the first antenna are functional. In block 520, a second antenna located at a second location on the vehicle attempts to receive the signal. In decision block 530, a monitoring module analyzes the signal to determine whether the signal was changed after transmission. If the signal was not changed after transmission, then the method 500 returns to block 510. If the signal was changed after transmission, then the method 500 proceeds to block 540. In decision block 540, a stolen vehicle tracking device verifies whether the first antenna is transmitting the signal according to established specifications, for example at a correct power level or if the signal is being transmitted at all. If the verification of whether the first antenna is transmitting the signal according to established specifications fails, for example because one of the first antenna or the network access device is not functioning, or because the first antenna is transmitting the signal at the wrong power level, then the method 500 returns to block 510. If the first antenna is transmitting the signal according to established specifications, then the method 500 proceeds to block 550. In block 550, a vehicle security system is activated.

Figure 6:
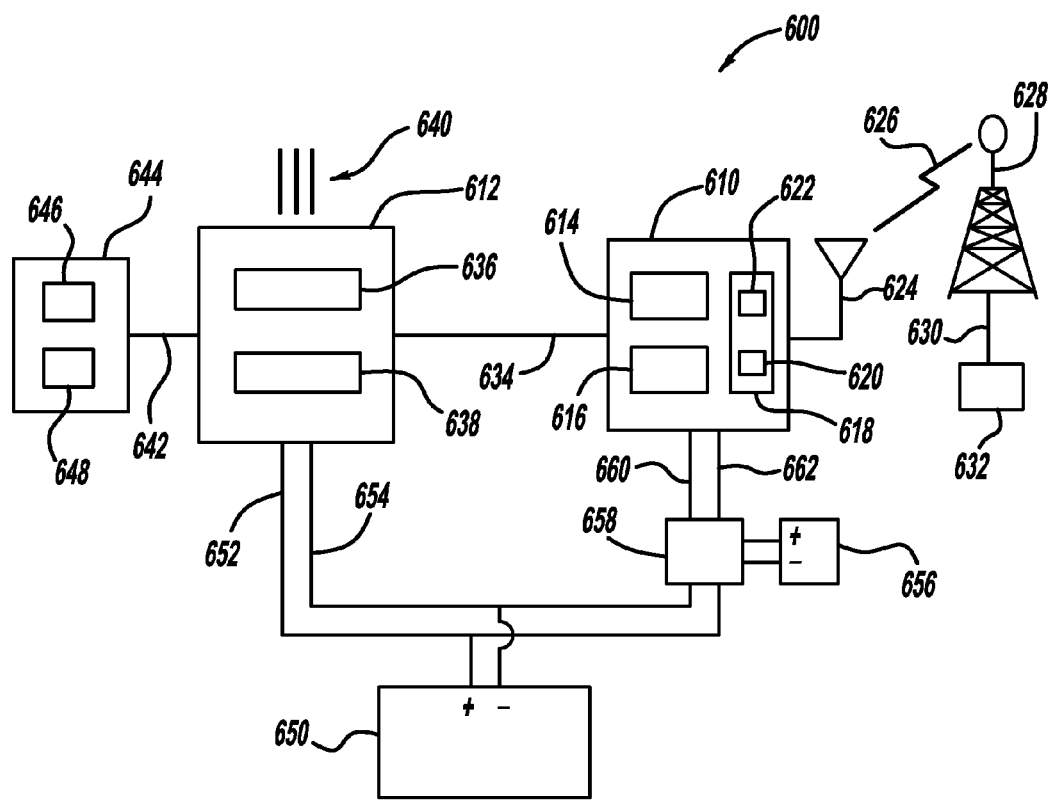
FIG. 6 is a schematic view of a telematics system including a telematics controller and a network access device.

Now referring to FIG. 6, a telematics system 600 is provided. All components found in the telematics system 600 but not pictured in system 100 may be included in the system 100. The system includes a network access device 610 and a telematics controller 612. The network access device 610 may include a processor 614 and storage 616. The processor 614 may be a programmable microprocessor or alternatively may be an application specific integrated circuit (ASIC), or other known processor. The storage 616 may be a memory, for example, random access memory, static memory, or other data storage device. The network access device 610 may also include a transceiver 618 which includes a transmitter 622 and a receiver 620. Alternatively, the network access device 610 may include an independent transmitter and receiver. The transceiver 618 may be in communication with an antenna 624. The transceiver 618 may communicate with a radio tower 628 as denoted by line 626. The communication 626 between the network access device 610 and the radio tower 628 may comprise one of a plurality of communication modes.

The transceiver 618 in the network access device 610 may be used for transmitting uplink communications and receiving downlink communication to and from the network 630 and service center 632 over the wireless communication link 626. The wireless communication link 626 may use a wireless protocol such as a standard cellular network protocol such as Advanced Mobile Phone Service (AMPS), Global System for Mobile Communications (GSM), Time Division Multiple Access (TDMA), Code Division Multiple Access (CDMA), and the like. To transmit data in the cellular environment, different types of standard bearer services exist including, but not limited to, general packet radio service (GPRS), short message service (SMS), circuit switched data service (CSD), and high-speed circuit switched data service (HSCSD). Further, standard transmission control protocol/internet protocol (TCP/IP) may also be used as well as satellite communications. In a further example, the transceiver 618 may be enabled using other wireless technologies such as Bluetooth technology. Bluetooth technology allows for the replacement of a wired connection by enabling devices to communicate with each other through a universal short-range radio link.

The radio tower 628 may be in communication with a service provider 632 including for example, a network server through a network 630. Network 630 may be an analog network such as a plain old telephone service (POTS) or a digital network for example, Ethernet over transmission control protocol/internet protocol (TCP/IP). In other examples, the network 630 could be one of several standard cellular communication networks, a satellite-based network, a public switched telecommunication network (PSTN), the Internet, an integrated services digital network (ISDN), and/or other communication networks. The service provider may include a service center to provide telematics applications and services to the vehicle. For instance, the service center may contain operators, content servers and content databases. The content servers for telematics applications and services may include traffic servers, map servers, user profile servers, location information servers, and the like. The content databases for telematics applications and services may include location information, user profiles, traffic content, map content, point-of-interest content, usage history, and the like.

The network access device 610 may be in communication with the telematics controller 612 through a communication interface 634. In some implementations the network access device 610 may be in the same package as the telematics controller 612. However, other implementations the network access device 610 may be provided in a separate package from the package of the telematics controller 612 and, therefore, may be located in a different area of the vehicle. Various information may be communicated between the telematics controller 612 and the network access device 610.

The telematics controller 612 may include a processor 636 and storage 638. The processor 636 may be a microprocessor, an application specific integrated circuit, a programmable gate array, or other processor. Further, the storage 638 may be a memory device for example, random access memory, read only memory, static memory, or may even be a hard drive or optical drive, or other means of data storage. The telematics controller 612 may be in communication with a plurality of other vehicle sensors and devices through a wire harness or over the vehicle bus as denoted by lines 640. In addition, the telematics controller 612 may be in communication with a user interface 644 as denoted by line 642. The user interface 644 may include a display 646 and controls 648 for providing user input such as vehicle parameters into the telematics controller 612. Also, the user interface 644 may include elements such as a keyboard or keypad, one or more control buttons, indicator lights, one or more speakers, a microphone, and any other user interface type elements for telematics applications and services. Optionally, the telematics controller 612 may also be connected to a positioning unit. The positioning unit could be a system that determines the geographic location of the vehicle such as a global positioning system (GPS), a dead-reckoning system, and the like.

Further, the telematics controller 612 may be in communication with other vehicle systems, such as the engine control system, the vehicle lock controls, the vehicle safety systems (e.g. seatbelt retractors, airbags, etc.), vehicle entertainment system, or a suspension control system to implement the described functions of the telematics controller 612 or network access device 610 based on parameters of such systems.

The telematics controller 612 may be powered by the vehicle battery 650 as denoted by lines 652 and 654. Alternatively, a voltage converter may be provided to convert from the vehicle battery voltage to a different voltage that may be appropriate for running the telematics controller 612. The voltage converter may be included in the package for the telematics controller 612 or alternatively may be in a separate package between the vehicle battery 650 and the telematics controller 612. The vehicle battery 650 may also provide power to the network access device 610.

A circuit 658 may be included between the vehicle battery 650 and the network access device 610. The circuit 658 may include a voltage converter to change the voltage provided to the network access device 610 in lines 660 and 662. In addition, the circuit 658 may be connected to a network access device battery 656. The network access device battery 656 may be charged while the vehicle is running and may for example, be switched to provide power to the network access device 610 when power from the vehicle power system (e.g., the battery or alternator) is not available. Further, the circuit 658 may control the monitoring and periodic powering of the network access device if the vehicle is turned off for a long period of time. Further, the circuit 658 may control the charging of the network access device battery 656 at appropriate times according to the environmental variables or the expected use cycle of the vehicle.

Figure 7:
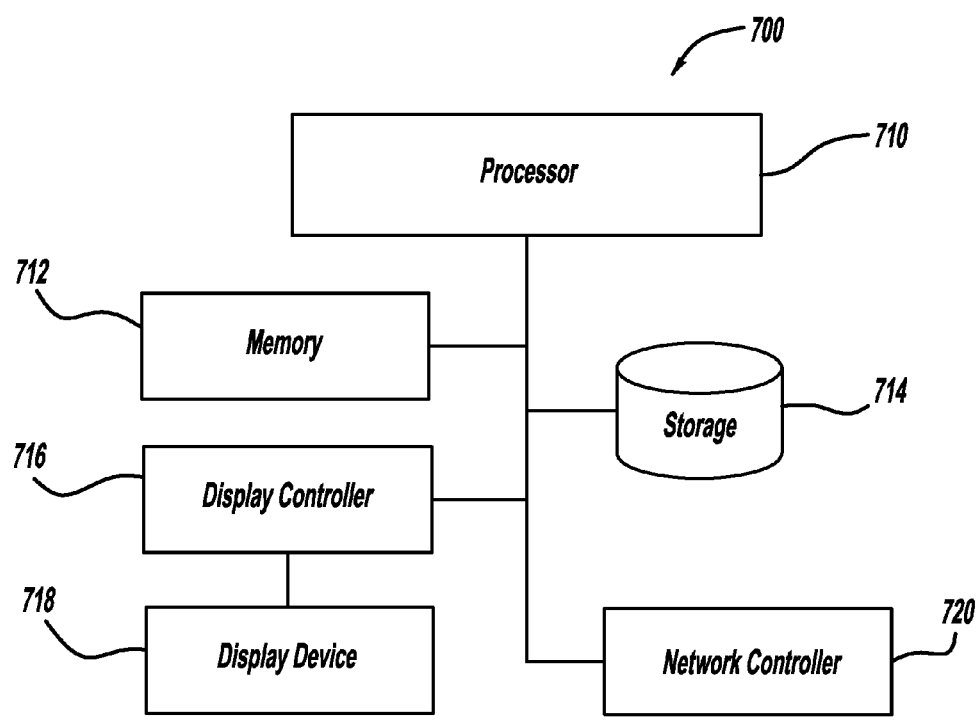
FIG. 7 is a schematic view of a computer system that may be used for implementing the methods provided herein.

Any of the modules, servers, or engines described may be implemented in one or more computer systems. One exemplary system is provided in FIG. 7. The computer system 700 includes a processor 710 for executing instructions such as those described in the methods discussed above. The instructions may be stored in a computer readable medium such as memory 712 or storage devices 714, for example a disk drive, CD, or DVD. The computer may include a display controller 716 responsive to instructions to generate a textual or graphical display on a display device 718, for example a computer monitor. In addition, the processor 710 may communicate with a network controller 720 to communicate data or instructions to other systems, for example other general computer systems. The network controller 720 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from the spirit of the invention, as defined in the following claims.

What is claimed is:

1. A method for self-detecting vehicle theft in a vehicle, comprising the following steps:
    transmitting a signal from a first location on the vehicle;
    attempting to receive the signal at a second location on the vehicle;
    determining whether the signal was changed, wherein determining whether the signal has changed comprises determining whether a measured magnitude of the signal is higher than a predetermined baseline magnitude; and
    activating a vehicle security system based on the change in the signal, wherein activating the vehicle security system is further based on whether the measured magnitude of the signal is higher than the predetermined baseline magnitude.

2. The method of claim 1, further comprising:
    verifying whether the signal is being transmitted from a transmission source;
    wherein activating the vehicle security system is based on both the change in the signal and the verification of whether the signal is being transmitted from the transmission source.

3. The method of claim 1, wherein determining whether the signal has changed further comprises detecting whether the signal reception is interrupted, and wherein activating the vehicle security system is further based on whether the signal reception is interrupted.

4. The method of claim 1, wherein determining whether the signal has changed further comprises determining whether a measured magnitude of the signal is lower than a second predetermined baseline magnitude, wherein activating the vehicle security system is further based on whether the measured magnitude of the signal is lower than the second predetermined baseline magnitude.

5. The method of claim 1, further comprising:
    inserting a pattern into the signal at the transmission source; and
    detecting the pattern in the signal, wherein activating the vehicle security system is further based on the detection of the pattern in the signal.

6. The method of claim 5, wherein the pattern comprises a cyclic pattern of transmitting the signal and not transmitting the signal.

7. The method of claim 1, further comprising:
    monitoring data in the signal;

determining authenticity of the signal based on the data, wherein activating the vehicle security system is further based on the authenticity of the signal.

\* \* \* \* \*